US 6,540,368 B2

(12) United States Patent
Akaoka (10) Patent No.: US 6,540,368 B2
(45) Date of Patent: Apr. 1, 2003

(54) SPREAD ILLUMINATING APPARATUS WITH MULTI-LAYER LIGHT CONDUCTIVE MEMBER (75) Inventor: Hiroki Akaoka, Iwata-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/098,412

(22) Filed: Mar. 18, 2002

(65) Prior Publication Data
US 2002/0135560 A1 Sep. 26, 2002

(30) Foreign Application Priority Data
Mar. 26, 2001 (JP) ........................................ 2001-087701

(51) Int. Cl.[7] ................................................ F21V 7/04
(52) U.S. Cl. ............................ 362/31; 362/27; 362/331; 349/62; 385/901
(58) Field of Search ............................. 362/27, 29, 30, 362/31, 331; 349/61, 62, 65; 385/31, 146, 147, 901; 359/628, 640

(56) References Cited

U.S. PATENT DOCUMENTS 5,046,826 A * 9/1991 Iwamoto et al. ............ 349/65
6,286,970 B1 * 9/2001 Egawa et al. ............... 362/31
6,461,007 B1 * 10/2002 Akaoka ...................... 362/31

FOREIGN PATENT DOCUMENTS

JP    2000-231814    8/2000
JP    2001-287341    10/2001

* cited by examiner

Primary Examiner—Alan Cariaso
Assistant Examiner—Ali Alavi
(74) Attorney, Agent, or Firm—Oliff & Berridge, PLC (57) ABSTRACT A spread illuminating apparatus provides uniform illumination and high brightness over a whole screen. A plurality of plate-like light conductive members form a multi-layer light conductive member. An optical path conversion means composed of grooves formed parallel to the thickness direction of each plate-like light conductive member and flat portions is provided on one surface of each of the plate-like light conductive members. Each groove of each plate-like light conductive member overlaps partly with each groove of adjacent plate-like light conductive members thereby constituting each multiple groove. A plurality of multiple grooves of the light conductive member are formed with inclination such that one multiple groove thereof overlaps partly with adjacent multiple grooves with the longitudinal direction of the light conductive member.

16 Claims, 8 Drawing Sheets

PRIOR ART

FIG. 7
PRIOR ART

SPREAD ILLUMINATING APPARATUS WITH MULTI-LAYER LIGHT CONDUCTIVE MEMBER

BACKGROUND OF THE INVENTION

1. Field of the Invention

The present invention relates to a spread illuminating apparatus used as an illuminating means for signboards, various kinds of reflection-type display devices, and more particularly for a liquid crystal display device.

2. Description of the Related Art

A liquid crystal display device characterized by low profile, small occupied volume, light weight, etc. has been extensively used in electric products including mobile phones and personal computers, and the demand therefor has been increased. However, since a liquid crystal of the liquid crystal display device emits no light itself, an illuminating apparatus must be provided when the liquid crystal display device is used in dark places where the solar or illumination light is not fully available. Thus, this illuminating apparatus is also desired to be compact and small in power consumption, and there has been a growing tendency to employ a low profile spread illuminating apparatus of side light type (light conductive member type).

Figure 5:
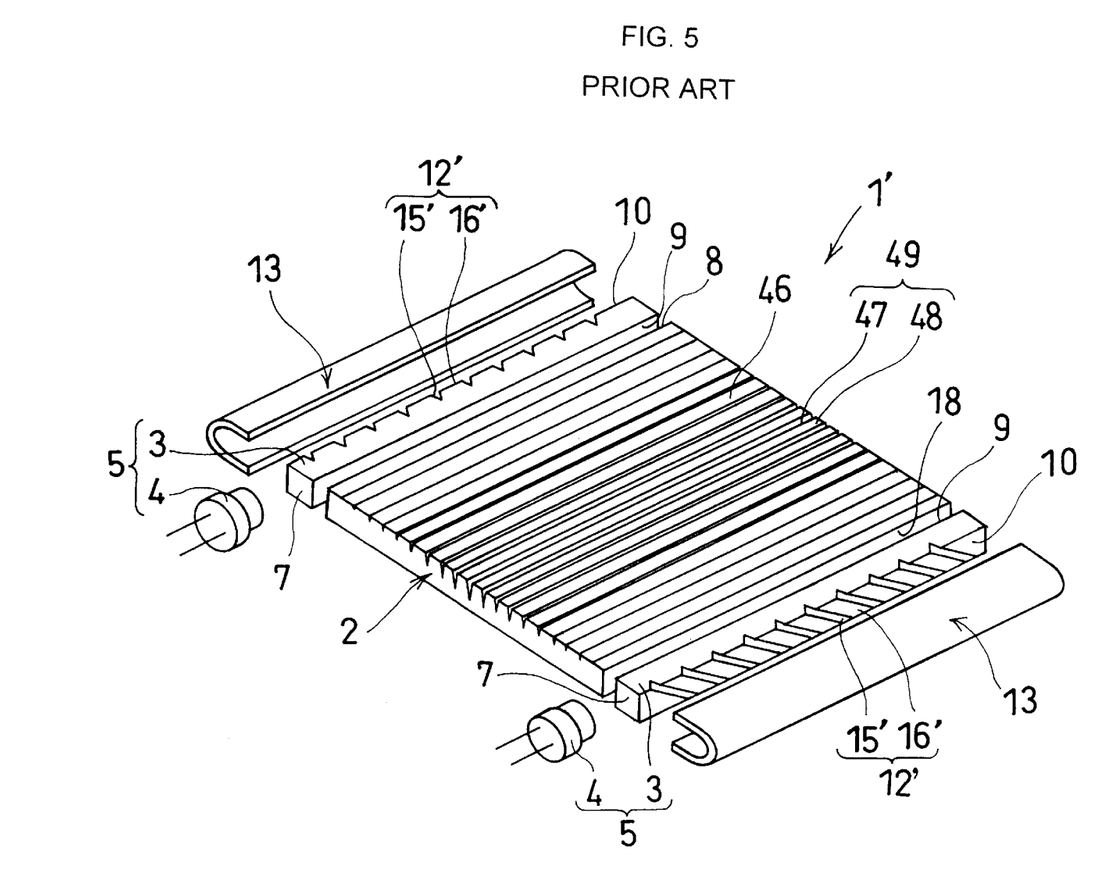
FIG. 5 is an exploded perspective view showing a conventional spread illuminating apparatus.

FIG. 5 shows an embodiment of a conventional spread illuminating apparatus of side light type. As shown in the figure, a spread illuminating apparatus 1' is generally composed of a transparent substrate 2 made of a light-transmissible material and at least one bar-like light source 5 disposed close to at least one of end surfaces 8 and 18 of the transparent substrate 2. The light source 5 is composed of a bar-like light conductive member 3 made of a transparent material and a spot-like light source (for example, a light-emitting diode) 4 disposed facing an end face 7 of the light conductive member 3. Light emitted from the light source 5 is guided into the transparent substrate 2 to irradiate a liquid crystal display device (not shown) disposed under the transparent substrate 2.

A light reflection pattern 49 is formed on an upper surface 46 of the transparent substrate 2. The light reflection pattern 49 is composed of grooves 47 each shaped triangular in section and running parallel to the longitudinal direction of the light conductive member 3 and flat portions 48 each formed between two adjacent grooves 47. The grooves 47 are set to have respective depths different from one another so that light guided in from the light conductive member 3 is reflected in a substantially uniform manner everywhere at the transparent substrate 2 irrespective of the distance from the light conductive member 8 to irradiate the liquid crystal display device (not shown) provided under the transparent substrate 2. Specifically, the depth of the grooves 47 gradually increases in proportion to the increase in distance from the light conductive member 3. The grooves 47 of the light reflection pattern 49 formed on the transparent substrate 2 are very minute and cannot be visually noticeable when observing the screen.

An optical path conversion means 12' comprising grooves 15' triangular in section and running parallel to the thickness direction of the light conductive member 3 and flat portions 16' is provided on a surface 10 of the light conductive member 3 opposite to a surface 9 facing the end surface 8 of the transparent substrate 2. This optical path conversion means 12' has a function to allow light emitted from the spot-like light source 4 to be made incident on the end surface 8 of the transparent substrate 2 in a substantially uniform manner. The light conductive member 3 is disposed such that the surface 9 thereof faces the end surface 8 of the transparent substrate 2 with a predetermined distance therebetween.

A light reflection member (frame) 13 is provided around the light conductive member 3 in order that light emitted from the spot-like light source 4 is fully utilized to be directed into the transparent substrate 2. The light reflection member 13 is substantially U-shaped in section, disposed so as to cover longitudinal surfaces of the light conductive member 3 except the surface 9 facing the transparent substrate 2 and further the upper and lower surfaces of the transparent substrate 2 at the vicinity of the end surface 8, and is adapted to recover light leaking from the light conductive member 3.

Figure 6:
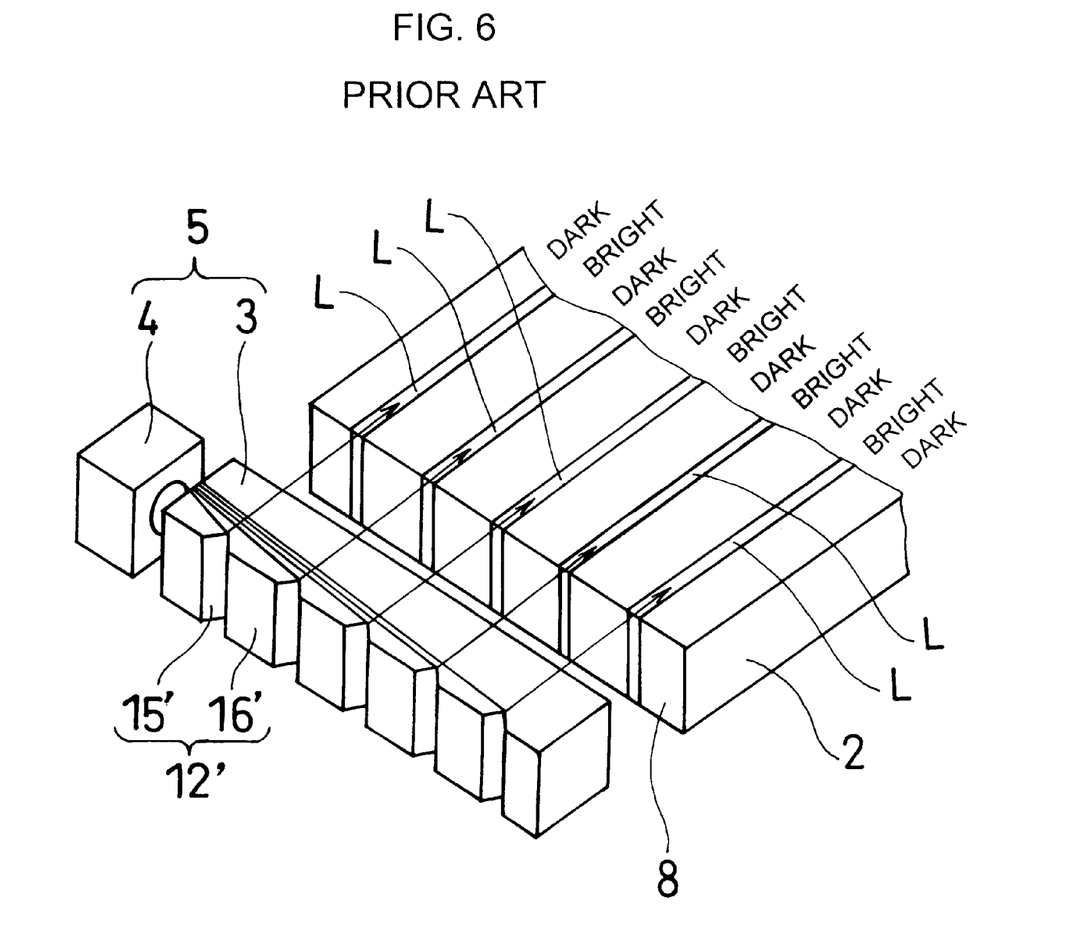
FIG. 6 is a view showing light rays each reflected at one groove and guided into a transparent substrate in a conventional spread illuminating apparatus.

However, with the optical path conversion means 12' described above, light emitted from the spot-like light source 4 is mostly reflected only at the grooves 15' to be guided into the transparent substrate 2, irradiating the transparent substrate 2 with many light rays L, and stripe-like fringes appear on a viewing surface as shown in FIG. 6. To overcome such a disadvantage, the applicant of the present invention proposed an optical path conversion means 12" having grooves 15" formed with a predetermined inclination angle with respect to the thickness direction of the light conductive member 3 as shown in FIG. 7 so as to increase an irradiation range per groove thereby realizing uniform light emission (Japanese Patent Application No. 2001-287341).

Figure 7:
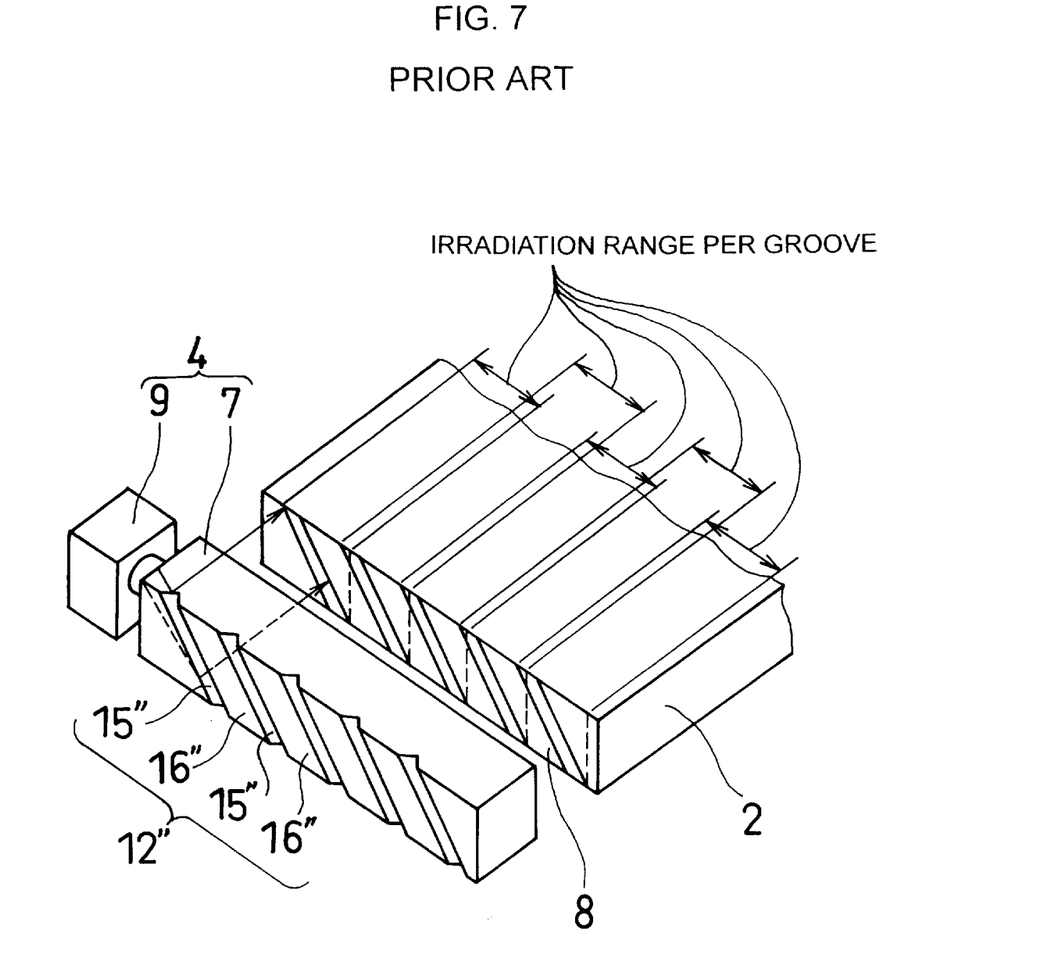
FIG. 7 is a view showing irradiation ranges (bright portions) of light guided into the transparent substrate, each covered by one groove in the conventional spread illuminating apparatus.

The optical path conversion means 12" shown in FIG. 7 is effective in softening stripe-like fringes on the viewing surface, but the brightness of the screen decreases due to the inclination angle of the grooves 15". When the grooves 15" are shaped substantially triangular or trapezoidal in section, the uniformity of light emission on the screen improves as the inclination angle of the grooves 15" increases. However, the brightness of the screen decreases as the inclination angle of the grooves 15" increases, and when the inclination angle exceeds a predetermined value, the brightness of the screen decreases in a greater degree than when a diffusion plate is inserted between the light conductive member and the transparent substrate to improve the uniformity of the light emitted from the screen, which was disclosed by the applicant of the present invention in Japanese Patent Laid-open No. 2000-231814. This comes from that, since the grooves 15" have flat surfaces, the inclination of the light reflected at the grooves 15" also increases as the inclination angle of the grooves 15" increases, thereby reducing the amount of the light reflected at the grooves 15" which, without repeated reflection in the light conductive member 3, is guided directly into the transparent substrate 2. The light made incident on the surface of the light conductive member 3 at an angle exceeding the critical angle leaks outside, or is reflected by the light reflection member 13 disposed covering the light conductive member 3 to return into the light conductive member 3. In either case, the light suffers loss with the brightness decreased

SUMMARY OF THE INVENTION

The present invention has been made in the light of the above problems and the object of the present invention is to provide a spread illuminating apparatus to simultaneously realize uniform and increased brightness over the whole screen.

In order to solve the above problems, according to a first aspect of the present invention, in a spread illuminating apparatus of side light type, comprising a transparent substrate made of a light-transmissible material; and at least one bar-like light source composed of a bar-like light conductive member and at least one spot-like light source provided at an end thereof, and disposed close to an end surface of the transparent substrate, the bar-like light conductive member is a multi-layer light conductive member composed of a plurality of plate-like light conductive members put into lamination, and an optical path conversion means is provided on a side surface of each of the plate-like light conductive members. Since the plurality of plate-like light conductive members having respective optical path conversion means are put into lamination, an optical path conversion means of the light conductive member multi-layered can be constituted by the combination of the configuration of the optical path conversion means of each plate-like light conductive member, thereby diversifying the configuration of the optical path conversion means (hereinafter referred to as "multiple optical path conversion means") of the light conductive member.

Further, in order to solve the above problems, according to a second aspect of the present invention, in the spread illuminating apparatus of the first aspect, the optical path conversion means of each plate-like light conductive member is composed of a plurality of grooves and a plurality of flat portions adjacent thereto. In this configuration, the plurality of grooves function as a light scattering part and reflect and guide light from the light conductive member into the transparent substrate.

Further, in order to solve the above problems, according to a third aspect of the present invention, in the spread illuminating apparatus of the first aspect, the optical path conversion means of the plate-like light conductive member is composed of a plurality of grooves with no flat portions. The plurality of grooves function as a light scattering part and reflect and guide light from the plate-like light conductive member into the transparent substrate.

Further, in order to solve the above problems, according to a fourth aspect of the present invention, in the spread illuminating apparatus of the second or third aspect, the grooves of each plate-like light conductive member are formed parallel to a thickness direction of the plate-like light conductive member. Since the grooves formed on each plate-like light conductive member are not inclined with respect to the thickness direction of the plate-like light conductive member, light reflected at the grooves can be efficiently guided into the transparent substrate, and the brightness on a viewing screen is held from degrading.

Further, in order to solve the above problems, according to a fifth aspect of the present invention, in the spread illuminating apparatus of the fourth aspect of, each groove on each plate-like light conductive member is formed to overlap partly with each groove on adjacent plate-like light conductive members such that the grooves on respective plate-like light conductive members as a whole constitute grooves (hereinafter referred to as "multiple grooves") of the multi-layer light conductive member, which are inclined with respect to the thickness direction of the multi-layer light conductive member. With this structure, the bright portion of light reflected at each groove on each plate-like light conductive member overlaps partly with the bright portion of light reflected at each groove on adjacent plate-like light conductive members, whereby the bright portions of light guided into the transparent substrate from the multi-layer light conductive member can be continuous with one another with respect to the longitudinal direction of the light conductive member.

Further, in order to solve the above problems, according to a sixth aspect of the present invention, in the spread illuminating apparatus of the fifth aspect, the multiple grooves are formed such that each thereof overlaps partly with adjacent ones with respect to the longitudinal direction of the light conductive member. With this structure, the bright portions of light reflected at each of the multiple grooves overlaps partly with the bright portion of light reflected at adjacent multiple grooves, whereby the bright portion of the light guided into the transparent substrate from the multi-layer light conductive member can be continuous with one another across the transparent substrate.

Further, in order to solve the above problems, according to a seventh aspect of the present invention, in the spread illuminating apparatus of the fourth aspect, each groove on each plate-like light conductive member is formed not to be aligned to each groove on adjacent plate-like light conductive members. With the structure, each light reflected at the groove can be spread at equal intervals entirely over the transparent substrate, thereby making bright and dark fringes generated on the transparent substrate less noticeable Further, in order to solve the above problems, according to an eighth aspect of the present invention, in the spread illuminating apparatus of the second, third, sixth or seventh aspect, the grooves on the optical path conversion means of the plate-like light conductive member are triangular in section. Further, according to a ninth aspect of the present invention, in the spread illuminating apparatus of the second, third, sixth or seventh aspect, the grooves of the optical path conversion means of the plate-like light conductive member are trapezoidal in section. With such configurations, the grooves function as a light scattering part to reflect and guide light from the light conductive member into the transparent substrate.

DESCRIPTION OF THE PREFERRED EMBODIMENTS

Preferred embodiments of the present invention are hereinafter explained referring to the attached drawings. The present invention proposes an improvement in the light source, in particular, in the light conductive member, of the conventional spread illuminating apparatus and the components identical with or corresponding to those of the conventional spread illuminating apparatus are represented by the same reference numerals and detailed description thereof is omitted.

Figure 1:
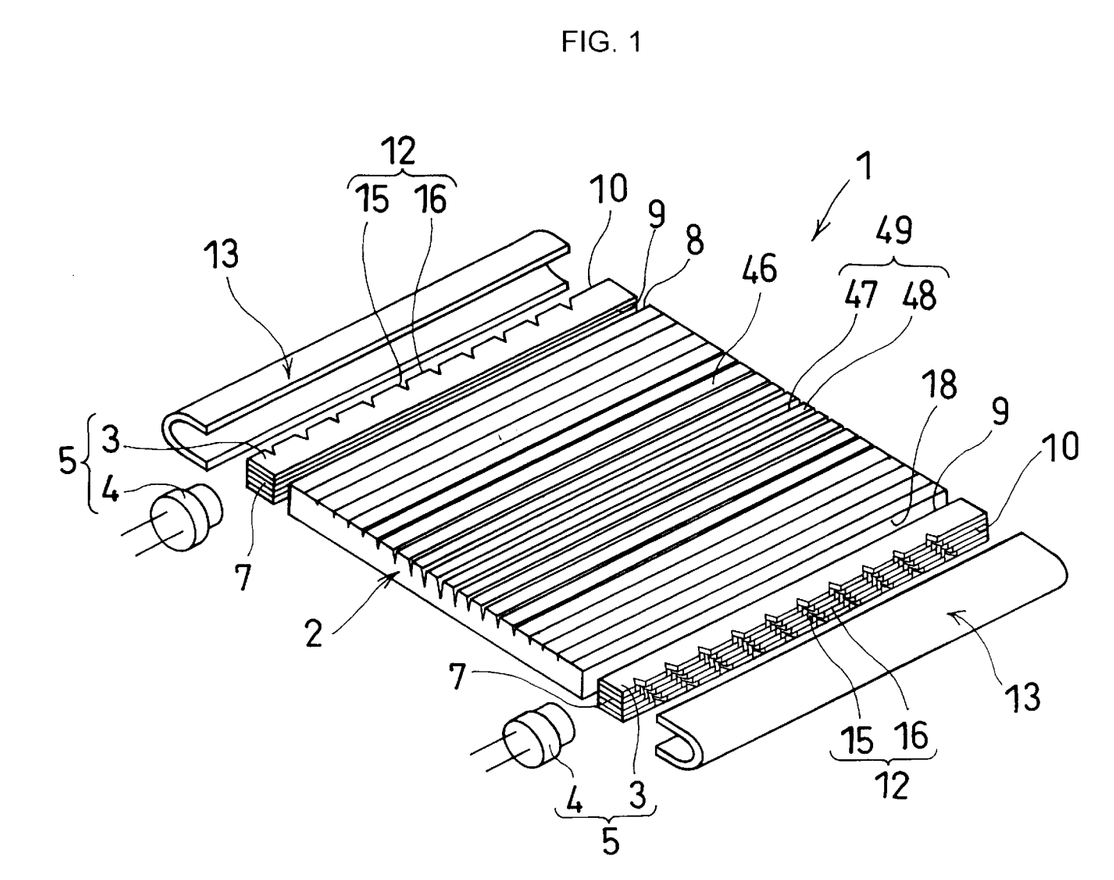
FIG. 1 is an exploded perspective view of a spread illuminating apparatus according to the present invention.

As shown in FIG. 1, a spread illuminating apparatus 1 of the present invention is generally composed of a transparent substrate 2, light sources 5 each comprising a bar-like light conductive member 3 and a spot-like light source 4 and disposed along end surfaces 8 and 18 of the transparent substrate 2, and light reflection members (frames) 13.

In a light reflection pattern 49 comprising grooves 47 and flat portions 48 and formed on an upper surface 46 of the transparent substrate 2, the depth of the grooves 47 gradually increases in proportion to the increase in distance from the bar-like light conductive members 3, and is set to be largest at the center of the transparent substrate 2, whereby lights coming from two light conductive members 3 can be reflected in a substantially uniform manner over the whole surface of the transparent substrate 2 irrespective of the distance from the light conductive members 3.

Figure 2:
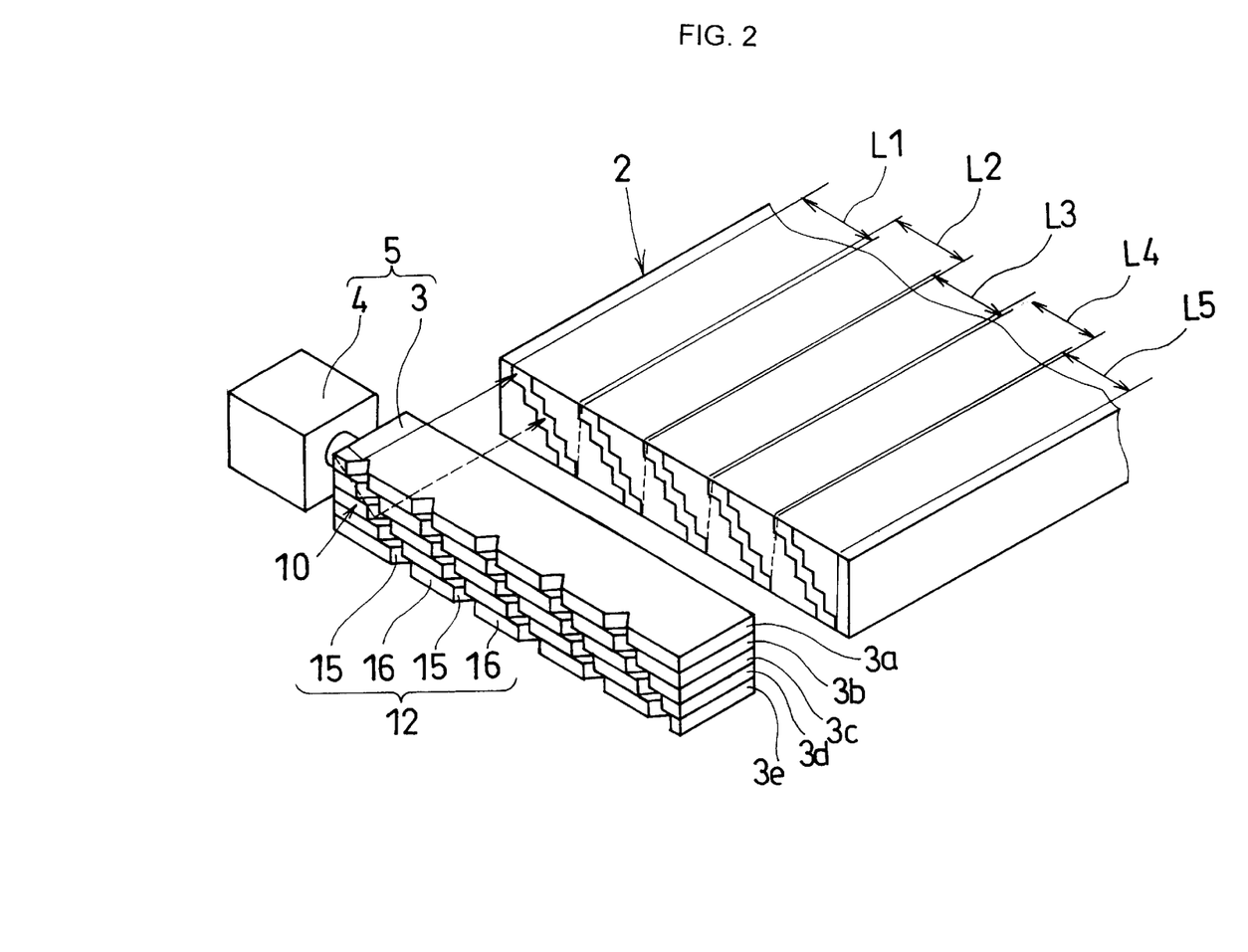
FIG. 2 is an enlarged perspective view showing an embodiment of a multiple optical path conversion means formed on a light conductive member (multi-layered) in a spread illuminating apparatus according to the present invention.
Figure 3A:
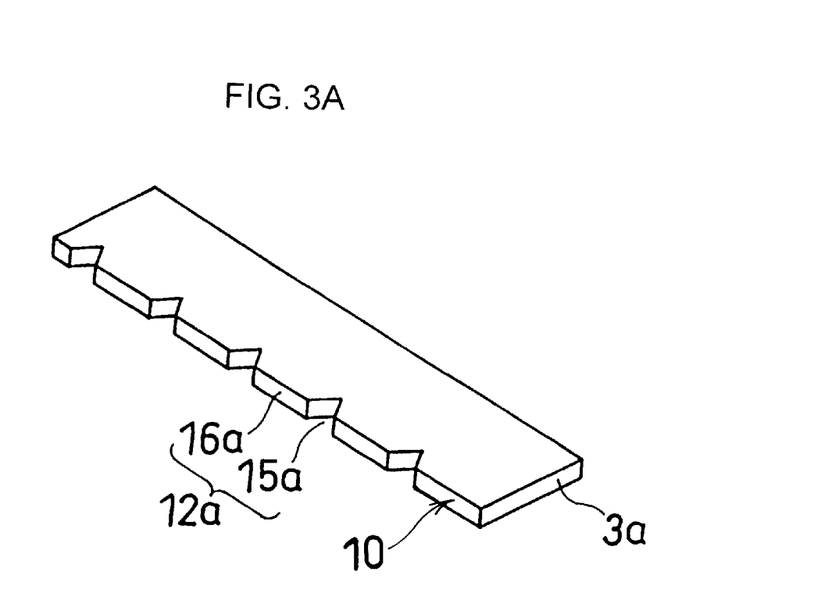
FIG. 3A is a perspective view showing a plate-like light conductive member of the multi-layer light conductive member shown in FIG. 2.

The light conductive member 3 is multi-layered with a plurality of plate-like light conductive members 3a (FIG. 3A), 3b, 3c, 3d and 3e as shown in FIG. 2. A multiple optical path conversion means 12 is formed on a surface 10 of the light conductive member 3 opposite to a surface 9 facing the end surface 8 of the transparent substrate 2. The multiple optical path conversion means 12 is composed of a plurality of multiple grooves 15 triangular in section and a plurality of multiple flat portions 16 adjacent thereto as shown in FIG. 2. The multiple grooves 15 of the multiple optical path conversion means 12 are very fine, and cannot be visually recognized. The spot-like light source 4 is disposed close to and facing an end face 7 of the light conductive member 3 The light reflection member 13 is disposed so as to cover the light conductive member 3 when members constituting the spread illuminating apparatus 1 are assembled with each other.

Grooves 15a to 15e of respective plate-like light conductive members 3a to 3e are formed parallel to the thickness direction of the plate-like light conductive members 3a to 3e which make up the light conductive member 3 in multiple layers, and are positioned so as to partly overlap with grooves 15a to 15e of adjacent plate-like light conductive members Specifically, for example, a leftmost (closest to the spot-like light source 4 in FIG. 2) groove 15a of the plate-like light conductive member 3a overlaps partly with a leftmost groove 15b of the adjacent plate-like light conductive member 3b, and a leftmost groove 15c of the plate-like light conductive member 3c overlaps partly with the leftmost groove 15b and a leftmost groove 15d of the adjacent plate-like light conductive members 3b and 3d, respectively. Similarly, second left grooves of the plate-like light conductive members 3a to 3e overlap partly with second left grooves of the adjacent plate-like light conductive members.

As described above, since the grooves 15a to 15e on the plate-like light conductive members 3a to 3e are each formed parallel to the thickness direction of the light conductive member 3, light reflected at flat surfaces of the grooves 15a to 15e is efficiently guided into the transparent substrate 2, and the brightness can be prevented from degrading. Further, since the grooves 15a to 15e, which are formed on the plate-like light conductive members 3a to 3e, respectively, so as to partly overlap with one another, are regarded as constituting one multiple groove 15, it turns out that a plurality of multiple grooves 15 are formed on the surface 10 of the light conductive member 3 with an inclination angle with respect to the thickness direction of the light conductive member 3, whereby irradiation ranges L1, L2, L3, L4 and L5 of the multiple grooves 15 at the transparent substrate 2 can be expanded in the longitudinal direction of the light conductive member 3 as shown in FIG. 2, and the uniformity of light emission on the screen can be improved.

Figure 3B:
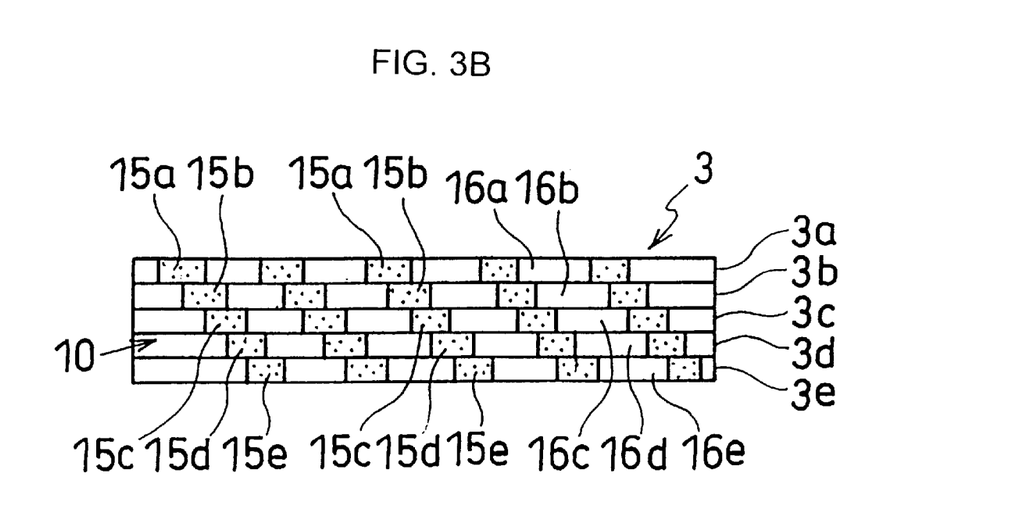
FIG. 3B is a plan view showing one surface of the multi-layer light conductive member having the multiple optical path conversion means shown in FIG. 2.

One multiple groove 15 composed of the grooves 15a to 15e overlapping partly with one another is formed so as to overlap partly with an adjacent multiple groove 16 with respect to the longitudinal direction of the light conductive member 3. Specifically, in FIG. 3B, a groove 15e constituting one multiple groove 15 on the leftmost of the light conductive member 3 is positioned to overlap partly with a groove 15a constituting another multiple groove 15 on the second left of the light conductive member 3

As shown in FIG. 2, the irradiation ranges L1 to L5 of respective multiple grooves at the transparent substrate 2 overlap partly with one another. To be specific, the irradiation range L2 overlaps partly with the irradiation ranges L1 and L3, the irradiation range L4 overlaps partly with the irradiation ranges L3 and L5, and the bright portions of light guided from the light conductive member 3 as a whole can be continuous with one another across the transparent substrate 2.

Figure 3C:
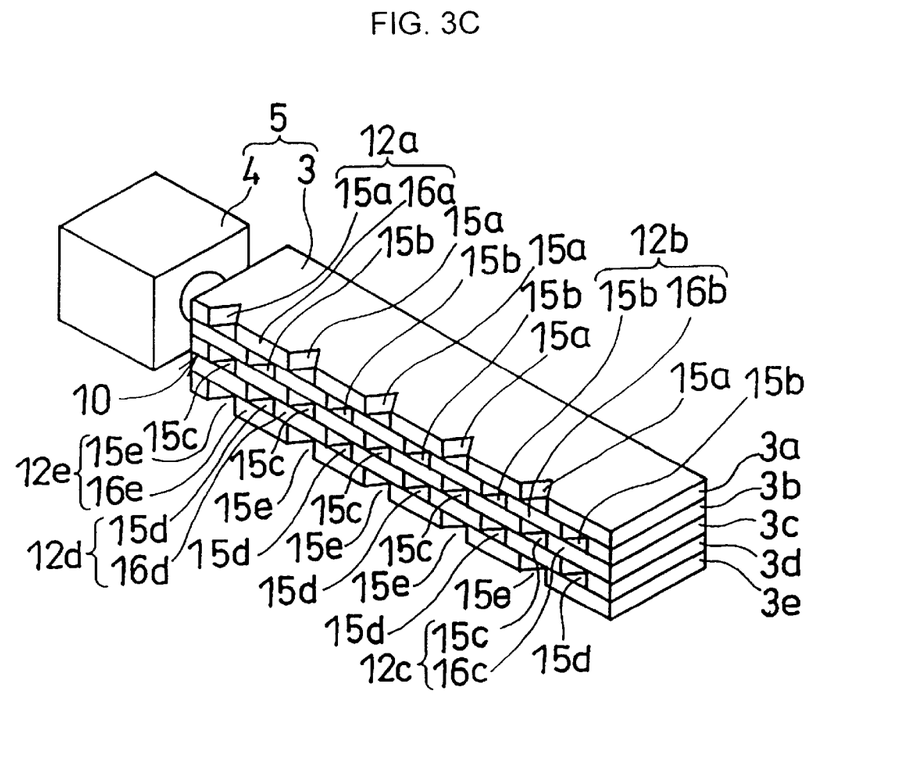
FIG. 3C is a perspective view showing another embodiment of a multiple optical path conversion means formed on the multi-layer light conductive member in a spread illuminating apparatus according to the present invention.

FIG. 3C shows another embodiment of a multiple optical path conversion means (second embodiment). In this embodiment, grooves 15a to 15e formed on plate-like light conductive members 3a to 3e are positioned not to overlap immediately with one another. To be specific, the light conductive member 3 is multi-layered with a plurality of plate-like light conductive members 3a to 3e, and optical path conversion means 12a to 12e each composed of a plurality of grooves 15a to 15e triangular in section and a plurality of flat portions 16a to 16e adjacent thereto are formed on the plate-like light conductive members 3a to 3e. The grooves 15a to 15e are formed parallel to the thickness direction of the plate-like light conductive members 3a to 3e. Each groove 15b on the plate-like light conductive member 3b is positioned substantially to the center of flat portions 16a on the plate-like light conductive member 3a in the longitudinal direction of the light conductive member 3. Further, each groove 15c on the plate-like light conductive member 3c is positioned substantially to the center of flat portions 16b on the plate-like light conductive member 3b, and each groove 15d on the plate-like light conductive member 3d is positioned substantially to the center of flat portions 16c. This means that the grooves 15a, 15c and 15e on respective plate-like light conductive members 3a, 3c and 3e are aligned to one another in the longitudinal direction of the light conductive member 3, while the grooves 15b and 15d on respective plate-like light conductive members 3b and 3d are aligned to each other.

The positioning of the grooves 15a to 15c is not limited to the above second embodiment. For example, it may be such that one groove 15b is formed to a position substantially halfway between one groove 15a and a next groove 15a, one groove 15c is formed to a position substantially halfway between the one groove 15a and the one groove 15b, and one groove 15d is formed to a position substantially halfway between the one groove 15b and the next groove 15a.

Figure 4:
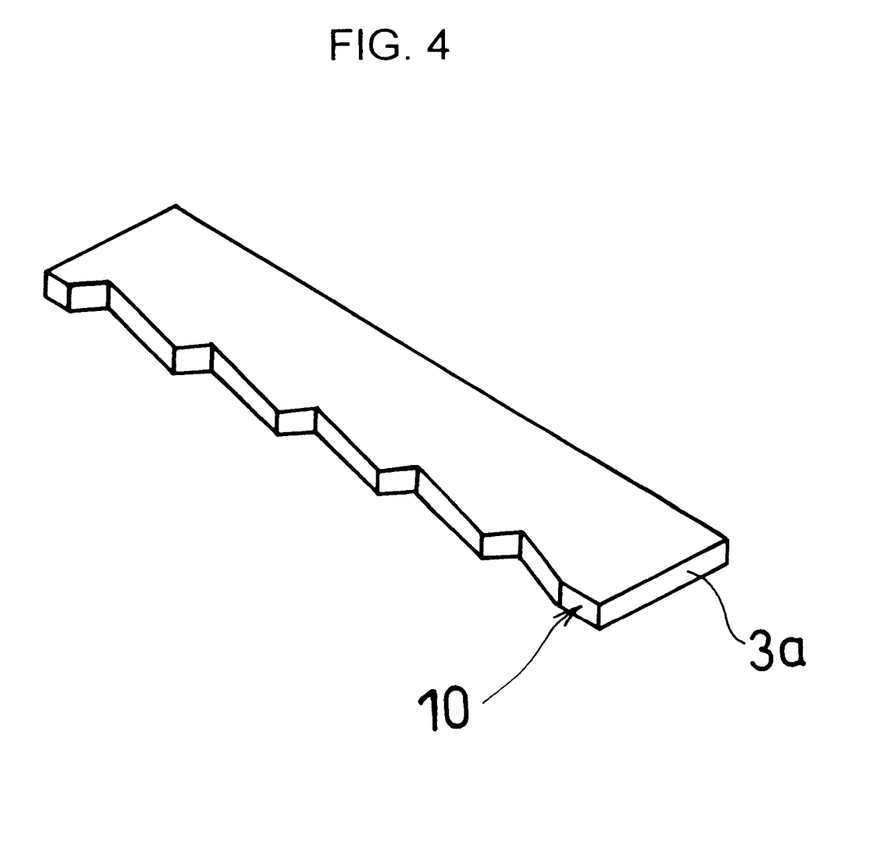
FIG. 4 is a perspective view showing a plate-like light conductive member with another configuration.

The section of the grooves 15a to 15e is not limited to triangle but may be substantially trapezoidal. Further, the optical path conversion means 12a to 12e may be composed of triangular grooves with no flat portions forming a step-like shape, as shown in FIG. 4.

In order to uniformly reflect light from the light conductive member 3 into the transparent substrate 2, the depth of the multiple grooves 15 preferably increases gradually in proportion to the increase in distance from the spot-like light source 4.

The embodiment of the present invention can he applied not only when the light source 5 is provided on the end surfaces 8 and 18 of the transparent substrate 2 as shown in FIG. 1, but also when the light source is provided only on one end surface, for example, the end surface 8, and can be applied further when the spot-like light source 4 is provided on both end surfaces of the light conductive member 3 regardless of the light source 5 being provided only on one end surface or both end surfaces of the transparent substrate 2. The light conductive member 3 may be structured such that at least one of the thickness and the width of the light conductive member gradually decreases with the increase in distance from the spot-like light source 4, thereby forming wedge-shape, where the light reflection pattern 49 formed on the transparent substrate 2 is appropriately structured.

In the spread illuminating apparatus in accordance with the present invention, since the light conductive member is multi-layered with a plurality of plate-like light conductive members each having an optical conversion means on one surface thereof, a multiple optical conversion means formed on the light conductive member is structured by combination of the optical conversion means of each plate-like light conductive members, whereby the multiple optical conversion means can be provided with diversified configurations. Thus, the multiple optical path conversion means can better adapted to the brightness characteristics of the screen, and the uniformity of the brightness can be improved.

Since the multiple grooves may each consist of grooves formed parallel to the thickness direction of the light conductive member, light can be reflected at the multiple grooves efficiently into the transparent substrate, whereby the brightness of the screen can be improved and the screen can be illuminated more uniformly.

Further, since each groove of each plate-like light conductive member may be formed so as to overlap partly with each groove of the adjacent plate-like light conductive members, the grooves overlapping partly with one another as a whole may constitute one multiple groove inclinded with respect to the thickness direction of the light conductive member, whereby the screen can be more uniformly illuminated. In addition, the inclination angle with respect to the thickness direction of the light conductive member can be changed according to the position of the grooves formed on each plate-like light conductive member and therefore can be easily set to a predetermined value, whereby the manufacturing efficiency can be improved accordingly.

Also, since one multiple groove of the light conductive member may be formed to overlap partly with a next multiple groove with respect to the longitudinal direction of the light conductive member, bright portions of light guided from the light conductive member into the transparent substrate can be continuous with one another across the transparent substrate, whereby the screen can be more uniformly illuminated.

Further, since the grooves of each plate-like light conductive member may be formed so as to be aligned to the grooves of adjacent plate-like light conductive member, light can be diffused at equal intervals entirely over the transparent substrate with a relatively small number of grooves, whereby bright and dark fringes generated on the transparent substrate can be softened.

Still further, since the optical path conversion means of the plate-like light conductive member may comprise grooves triangular or trapezoidal in section and flat portions or may comprise grooves triangular in section with no flat portions, light emitted from the spot-like light source can be efficiently reflected into the transparent substrate, whereby the screen can be more uniformly illuminated.

What is claimed is:

1. A spread illuminating apparatus of side light type, comprising:
    a transparent substrate made of a light-transmissible material; and
    at least one light source which is composed of a bar-like light conductive member and at least one spot-like light source provided at an end of the bar-like light conductive member, and which is provided close to an end surface of the transparent substrate, characterized in that:
        the bar-like light conductive member is a multi-layer light conductive member consisting of a plurality of plate-like light conductive members put into lamination, and that:
        an optical path conversion means is provided on a surface of each of the plate-like light conductive members constituting the multi-layer light conductive member.

2. A spread illuminating apparatus according to claim 1, wherein the optical path conversion means is composed of a plurality of grooves and a plurality of flat portions adjacent thereto.

3. A spread illuminating apparatus according to claim 1, wherein the optical path conversion means is composed of a plurality of grooves.

4. A spread illuminating apparatus according to claim 2, wherein each groove on each plate-like light conductive member is formed parallel to a thickness direction of the plate-like light conductive member.

5. A spread illuminating apparatus according to claim 4, wherein each groove on each plate-like light conductive member is formed to overlap partly with each groove on adjacent plate-like light conductive members such that the grooves on respective plate-like light conductive members as a whole constitute a plurality of multiple grooves of the multi-layer light conductive member, which are inclined with respect to the thickness direction of the multi-layer light conductive member.

6. A spread illuminating apparatus according to claim 5, wherein the plurality of multiple grooves are formed in such a manner that one multiple groove thereof overlaps partly with adjacent multiple grooves with regard to a longitudinal direction of the multi-layer light conductive member.

7. A spread illuminating apparatus according to claim 4, wherein each groove on each plate-like light conductive member is formed not to be aligned to each groove on adjacent plate-like light conductive members.

8. A spread illuminating apparatus according to claim 2, wherein the grooves of the optical path conversion means provided on the plate-like light conductive member are triangular in section.

9. A spread illuminating apparatus according to claim 2, wherein the grooves of the optical path conversion means provided on the plate-like light conductive member are trapeziodal in section.

10. A spread illuminating apparatus according to claim 3, wherein each groove on each plate-like light conductive member is formed parallel to a thickness direction of the plate-like light conductive member.

11. A spread illuminating apparatus according to claim 3, wherein the grooves of the optical path conversion means provided on the plate-like light conductive member are triangular in section.

12. A spread illuminating apparatus according to claim 6, wherein the grooves of the optical path conversion means provided on the plate-like light conductive member are triangular in section.

13. A spread illuminating apparatus according to claim 7, wherein the grooves of the optical path conversion means provided on the plate-like light conductive member are triangular in section.

14. A spread illuminating apparatus according to claim 3, wherein the grooves of the optical path conversion means provided on the plate-like light conductive member are trapezoidal in section.

15. A spread illuminating apparatus according to claim 6, wherein the grooves of the optical path conversion means provided on the plate-like light conductive member are trapezoidal in section.

16. A spread illuminating apparatus according to claim 7, wherein the grooves of the optical path conversion means provided on the plate-like light conductive member are trapezoidal in section.

* * * * *